(12) United States Patent
 Taylor

(10) Patent No.: US 10,419,250 B1
(45) Date of Patent: Sep. 17, 2019

(54) SYSTEMS AND METHODS FOR IMPROVED CONTINUOUS TIME LINEAR EQUALIZATION (CTLE)

(71) Applicant: Micron Technology, Inc., Boise, ID (US)

(72) Inventor: Jennifer E. Taylor, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/914,913

(22) Filed: Mar. 7, 2018

(51) Int. Cl.
 *H04B 1/10* (2006.01)
 *H04L 25/03* (2006.01)
 *H04L 27/01* (2006.01)

(52) U.S. Cl.
 CPC .. *H04L 25/03885* (2013.01); *H04L 25/03038* (2013.01); *H04L 25/03057* (2013.01); *H04L 27/01* (2013.01)

(58) Field of Classification Search
 CPC ............... H04L 25/03885; H04L 27/01; H04L 25/03038; H04L 25/03057; H04L 27/2614; H03G 3/3036; H03H 11/1291

USPC .......................... 375/229–232, 350, 346, 345
See application file for complete search history.

(56) References Cited

U.S. PATENT DOCUMENTS

| 9,755,599 B2 * | 9/2017 | Yuan ..................... H03G 3/3036 |
| 9,893,912 B1 * | 2/2018 | Wei ...................... H04L 27/2614 |
| 2006/0001504 A1 * | 1/2006 | Singh .................. H03H 11/1291 333/28 R |

* cited by examiner

*Primary Examiner* — Phuong Phu
(74) *Attorney, Agent, or Firm* — Fletcher Yoder, P.C.

(57) ABSTRACT

A continuous time linear equalization (CTLE) system is provided. The CTLE system includes a first adjustable circuit comprising a first adjustable resistive-capacitive (RC) source degeneration circuit and a first differential amplifier stage circuit. The CTLE system also includes a second adjustable circuit electrically coupled to the first adjustable circuit and configured to adjust a frequency suppression of a data signal received by the CTLE system. The CTLE system is configured to provide a gain-versus-frequency curve for the data signal based on adjustments to the first adjustable circuit, adjustments to the second adjustable circuit, or a combination thereof.

20 Claims, 7 Drawing Sheets

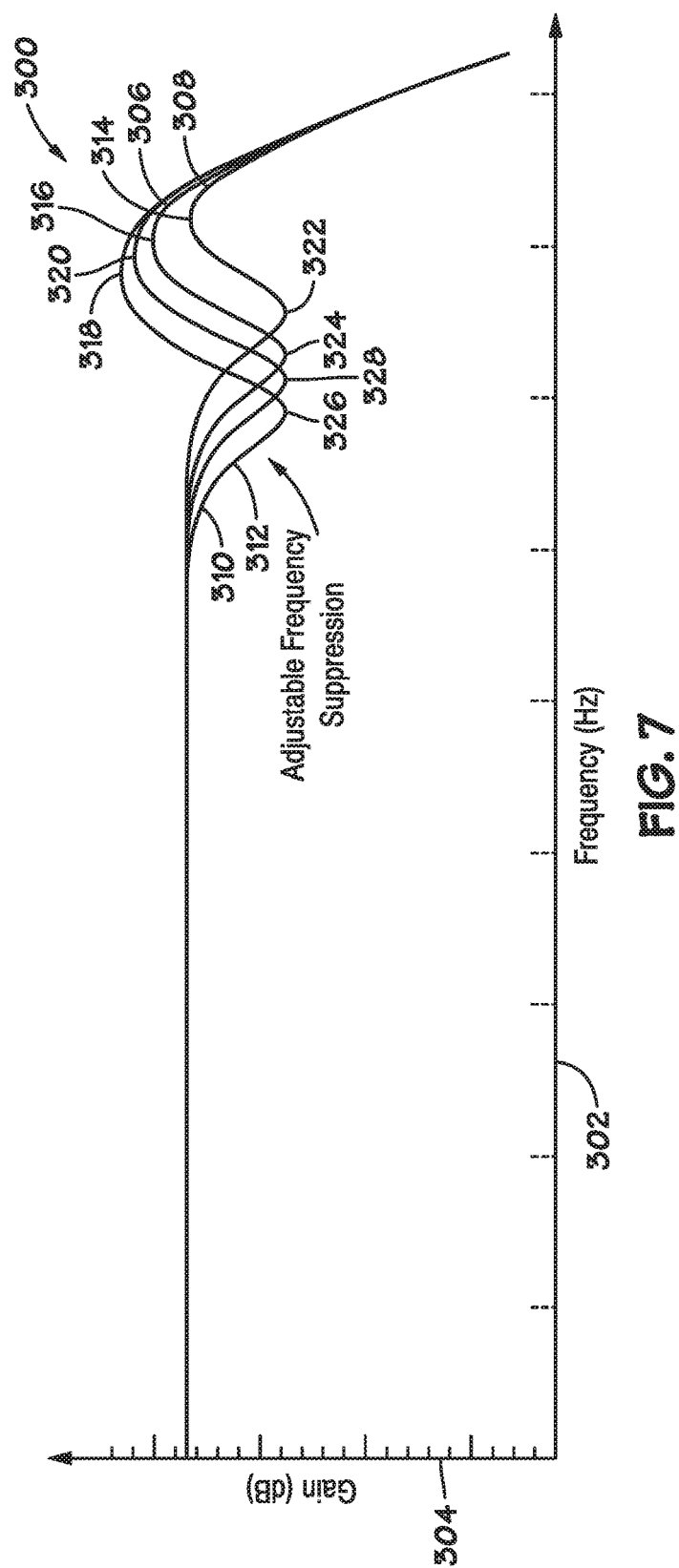

SYSTEMS AND METHODS FOR IMPROVED CONTINUOUS TIME LINEAR EQUALIZATION (CTLE)

BACKGROUND

Field of the Present Disclosure

The present disclosure relates to linear equalization, and more specifically, to systems and methods for improving continuous time linear equalization (CTLE).

Description of Related Art

Continuous time linear equalization (CTLE) may be used to process signals in various systems such as input buffers. The input buffers may be used in random access memory (RAM) devices as well as in other devices that may be employed in electrical systems to provide data processing and/or storage. The input buffers may receive data signals from a device communicatively coupled to the RAM device and then store the data for further use. For example, certain RAM devices, such as synchronous dynamic RAM (SDRAM) devices may have multiple memory banks having many addressable memory elements. Certain of the SDRAM devices may include input buffers suitable for receiving data to be stored in the addressable memory elements. In certain SDRAM devices, the input buffers may receive data input signals at high speeds, such as speeds of 1 gigabits per second (Gbps) or more. CTLE techniques may then be used to process the input signals for conversion into binary bit data. By processing the signals via CTLE techniques, the input buffers may provide for more efficient communication with external devices. It may be useful to improve systems and methods that incorporate CTLE techniques.

Embodiments of the present disclosure may be directed to one or more of the problems set forth above.

BRIEF DESCRIPTION OF THE DRAWINGS

Various aspects of this disclosure may better be understood upon reading the following detailed description and upon reference to the drawings in which:

FIG. 7 is a diagram depicting yet other gain-versus-frequency curves that may be provided using the CTLE techniques described herein, in accordance with an embodiment.

DETAILED DESCRIPTION OF SPECIFIC EMBODIMENTS

Figure 1:
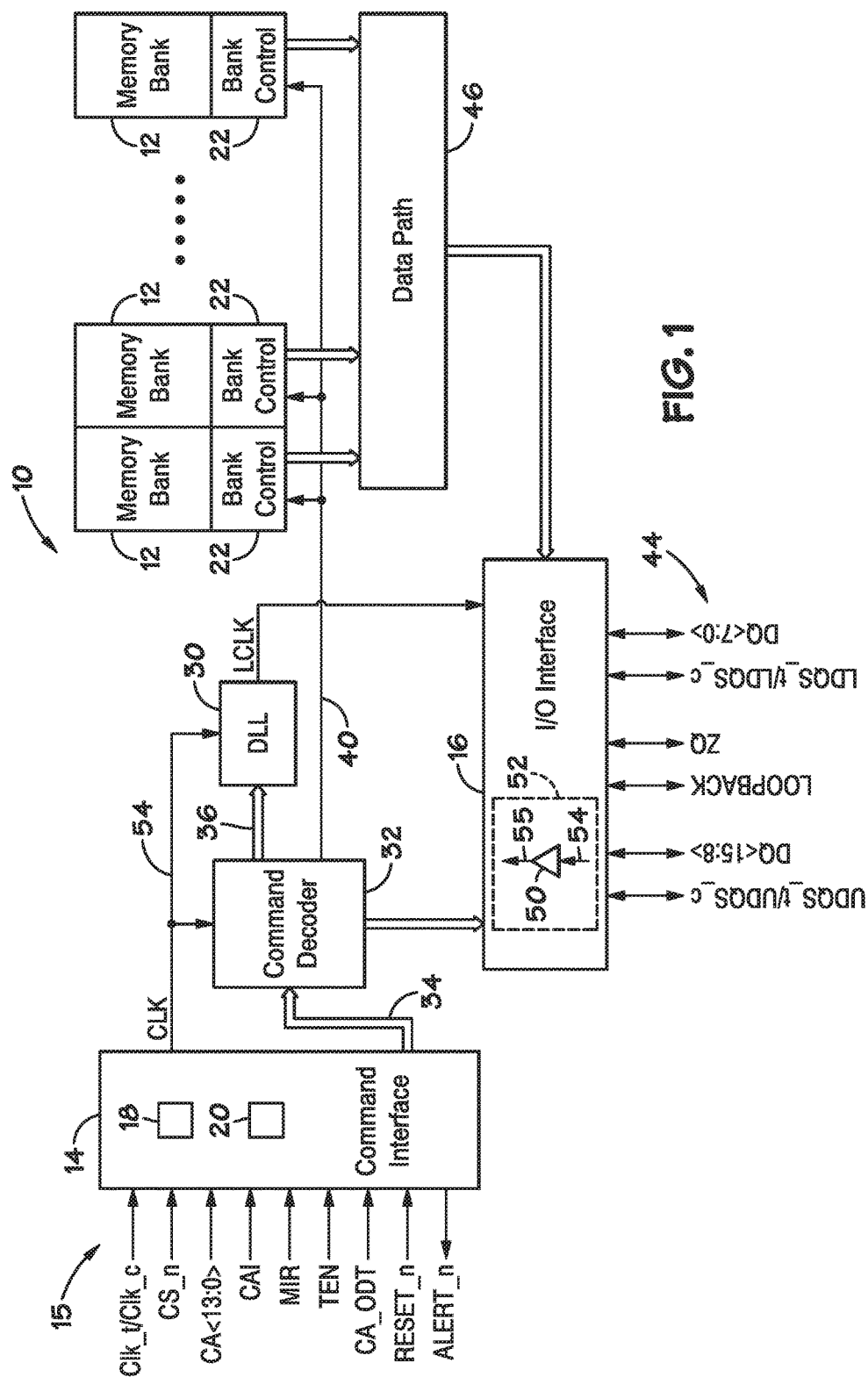
FIG. 1 is a block diagram illustrating an organization of a memory device that may include a continuous time linear equalization (CTLE) system disposed in an input buffer, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many electrical devices may include random access memory (RAM) memory devices coupled to processing circuitry, and the memory devices may provide storage for data processing. Examples of RAM devices include dynamic RAM (DRAM) devices and synchronous DRAM (SDRAM) devices, which may store individual bits electronically. The stored bits may be organized into addressable memory elements (e.g., words), which may be stored in memory banks. To receive and to transmit the bits, the RAM devices may include certain data communications circuitry as well as communication lines useful in saving and retrieving the bits from the memory bank. In certain DRAM and SDRAM devices, input buffers may be used to store data that may be transmitted at high speeds, such as speeds in excess of 1 Gbps.

The input buffers may include certain circuitry, for example, a continuous time linear equalization (CTLE) system. In certain embodiments, the CTLE system may receive signals representative of input data. The signals may have previously traveled through various interconnects inside a system to reach their destination (e.g., input buffer), so any electrical degradation induced at the transmitter, connectors, traces, cabling, and the receiver may have an effect on the timing and quality of the signal. For example, waveform distortions in the signal may be caused by impedance mismatches like stubs and vias, frequency dependent attenuation, and electromagnetic coupling between signal traces (e.g., crosstalk). Further, high speed signals moving through a channel may be subjected to high frequency impairments such as reflections, dielectric loss, and loss due to a skin effect. These impairments may degrade the quality of the signal making it more problematic for a receiver system (e.g., input buffer) to interpret the signal data correctly.

The techniques described herein include CTLE systems suitable for frequency gain and/or frequency suppression in an input buffer. For example, the CTLE systems described herein may compensate for loss after a signal travels through a communication channel by restoring frequency content (e.g., via amplification) that may have been lost due to the communication channel attenuation, and further suppress certain frequencies where noise (e.g., noise amplification) may be of concern. The CTLE systems described further below may include adjustable embodiments, such that a magnitude of a gain peak and suppression, a location of the frequency gain and suppression, and a width of peaks may be adjusted. By providing for an adjustable CTLE system, the techniques described herein may provide for input buffers that may operate in high speed data communications (e.g., over 1 Gbps) in a more efficient and flexible manner.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a double data rate type five synchronous dynamic random access memory (DDR5 SDRAM) device. Various features of DDR5 SDRAM as further described herein allow for reduced power consumption, more bandwidth, and more storage capacity compared to prior generations of DDR SDRAM.

The memory device 10, may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., x8 or x16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabyte (Gb) DDR5 SDRAM, the memory chip may include 16 memory banks 12, arranged into 8 bank groups, each bank group including 2 memory banks. For a 16 Gb DDR5 SDRAM, the memory chip may include 32 memory banks 12, arranged into 8 bank groups, each bank group including 4 memory banks, for instance. Various other configurations, organization and sizes of the memory banks 12 on the memory device 10 may be utilized depending on the application and design of the overall system.

The memory device 10 may include a command interface 14 and an input/output (I/O) interface 16. The command interface 14 is configured to provide a number of signals (e.g., signals 15) from an external device (not shown), such as a processor or controller. The processor or controller may provide various signals 15 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to ensure proper handling of the signals 15. The command interface 14 may receive one or more clock signals from an external device. Generally, double data rate (DDR) memory utilizes a differential pair of system clock signals, referred to herein as the true clock signal (Clk_t/) and the complementary clock signal (Clk_c). The positive clock edge for DDR refers to the point where the rising true clock signal Clk_t/ crosses the falling complementary clock signal Clk_c, while the negative clock edge indicates that transition of the falling true clock signal Clk_t and the rising of the complementary clock signal Clk_c. Commands (e.g., read command, write command (WrCmd), etc.) are typically entered on the positive edges of the clock signal and data is transmitted or received on both the positive and negative clock edges.

The clock input circuit 18 receives the true clock signal (Clk_t/) and the complementary clock signal (Clk_c) and generates an internal clock signal CLK. The internal clock signal CLK is supplied to an internal clock generator, such as a delay locked loop (DLL) circuit 30. The DLL circuit 30 generates a phase controlled internal clock signal LCLK based on the received internal clock signal CLK. The phase controlled internal clock signal LCLK is supplied to the I/O interface 16, for instance, and is used as a timing signal for determining an output timing of read data.

The internal clock signal CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the DLL circuit 30 over the bus 36 to coordinate generation of the phase controlled internal clock signal LCLK. The phase controlled internal clock signal LCLK may be used to clock data through the IO interface 16, for instance.

Further, the command decoder 32 may decode commands, such as read commands, write commands, mode-register set commands, activate commands, etc., and provide access to a particular memory bank 12 corresponding to the command, via the bus path 40. As will be appreciated, the memory device 10 may include various other decoders, such as row decoders and column decoders, to facilitate access to the memory banks 12. In one embodiment, each memory bank 12 includes a bank control block 22 which provides the necessary decoding (e.g., row decoder and column decoder), as well as other features, such as timing control and data control, to facilitate the execution of commands to and from the memory banks 12.

The memory device 10 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 14 using the clock signals (Clk_t/and Clk_c). The command interface may include a command address input circuit 20 which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA<13:0> bus. Access to specific banks 12 within the memory device 10 is encoded on the CA<13:0> bus with the commands.

In addition, the command interface 14 may be configured to receive a number of other command signals. For instance, a command/address on die termination (CA_ODT) signal may be provided to facilitate proper impedance matching within the memory device 10. A reset command (RESET_n) may be used to reset the command interface 14, status registers, state machines and the like, during power-up for instance. The command interface 14 may also receive a command/address invert (CAI) signal which may be provided to invert the state of command/address signals CA<13:0> on the command/address bus, for instance, depending on the command/address routing for the particular memory device 10. A mirror (MIR) signal may also be provided to facilitate a mirror function. The MIR signal may be used to multiplex signals so that they can be swapped for enabling certain routing of signals to the memory device 10, based on the configuration of multiple memory devices in a particular application. Various signals to facilitate testing of the memory device 10, such as the test enable (TEN) signal, may be provided, as well. For instance, the TEN signal may be used to place the memory device 10 into a test mode for connectivity testing.

The command interface 14 may also be used to provide an alert signal (ALERT_n) to the system processor or controller for certain errors that may be detected. For instance, an alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during certain operations, such as the connectivity test mode executed using the TEN signal, as described above.

Data for read and write commands may be sent to and from the memory device 10, utilizing the command and clocking signals discussed above, by transmitting and receiving data signals 44 through the IO interface 16. More specifically, the data may be sent to or retrieved from the memory banks 12 over the data path 46, which includes a plurality of bi-directional data buses. Data IO signals, generally referred to as DQ signals, are generally transmitted and received in one or more bi-directional data busses. For certain memory devices, such as a DDR5 SDRAM memory device, the IO signals may be divided into upper and lower bytes. For instance, for a x16 memory device, the IO signals may be divided into upper and lower IO signals (e.g., DQ<15:8> and DQ<7:0>) corresponding to upper and lower bytes of the data signals, for instance.

The data (e.g., IO signals) for read and writes may be addressed to certain memory (e.g., memory cells) in the memory banks 12. The techniques described herein provide for a continuous time linear equalization (CTLE) system 50 that may process input signals (e.g., DQ<15:8> and DQ<7:0>) received via the I/O interface 16. The CTLE system 50 may be included, for example, in an input buffer system 52. Incoming signals may be processed by the CTLE system 50 to provide both frequency gain and frequency suppression in the input buffer 52. The suppression of certain frequencies is useful in cases where noise amplification is a concern.

For example, the CTLE system 50 may compensate for loss after a signal travels through a communication channel 54 by amplifying the received signal, thus restoring frequency content that may have been lost due to the communication channel attenuation. The CTLE system 50 may additionally suppress certain frequencies where noise (e.g., noise amplification) may be of concern. The CTLE system 50 may adjust a magnitude of a gain peak and suppression, a location of frequency gain and suppression, and a width of peaks. The signal process by the CTLE system 50 may then be provided to other components or systems of the input buffer system 52, for example, via a communication channel 55. It is to be noted that while the CTLE system 50 is depicted as disposed in the input buffer system 52, the CTLE system 50 may be disposed in any system that may benefit from amplification and/or frequency suppression or filtering, such as optical receivers, graphics circuitry, and so on. Accordingly, signals received and processed by the CTLE system 50 may be more flexibly adjusted, as further described below.

An impedance (ZQ) calibration signal may also be provided to the memory device 10 through the IO interface 16. The ZQ calibration signal may be provided to a reference pin and used to tune output drivers and ODT values by adjusting pull-up and pull-down resistors of the memory device 10 across changes in process, voltage and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the IO pins.

In addition, a loopback signal (LOOPBACK) may be provided to the memory device 10 through the IO interface 16. The loopback signal may be used during a test or debugging phase to set the memory device 10 into a mode wherein signals are looped back through the memory device 10 through the same pin. For instance, the loopback signal may be used to set the memory device 10 to test the data output (DQ) of the memory device 10. Loopback may include both a data and a strobe or possibly just a data pin. This is generally intended to be used to monitor the data captured by the memory device 10 at the IO interface 16.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory system 10. Accordingly, it should be understood that the block diagram of FIG. 1 is only provided to highlight certain functional features of the memory device 10 to aid in the subsequent detailed description. For example, the fuse array broadcasting system 50 or certain circuitry of the broadcasting system 50 may be disposed as part of one bank control 22 or all bank controls 22, as part of one memory bank 12 or all memory banks 12, or combinations thereof.

Figure 2:
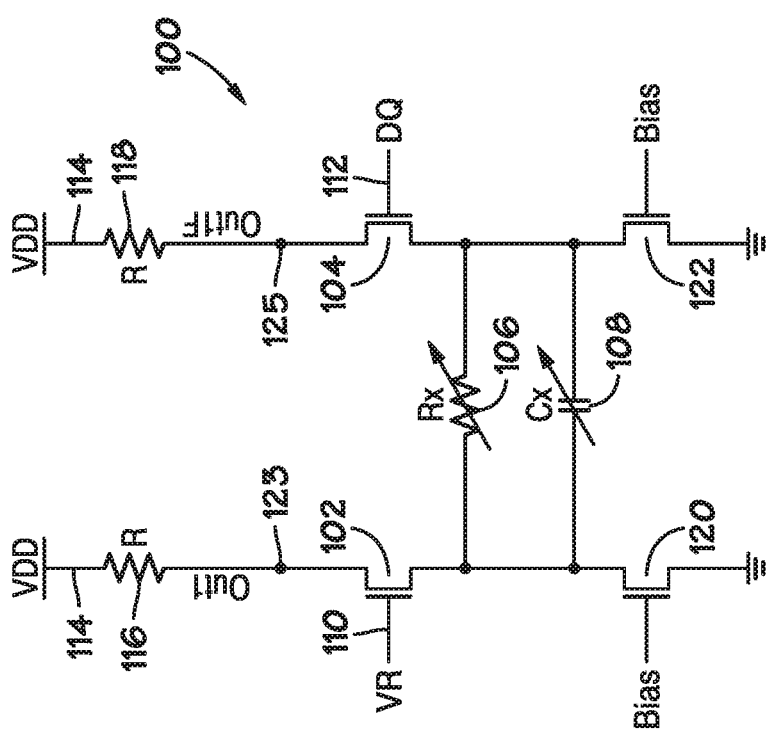
FIG. 2 is a circuit diagram of an active CTLE system which may provide for amplification and resistance-capacitance (RC) source degeneration of input signals for the memory device of FIG. 1, in accordance with an embodiment.

It would be beneficial to illustrate an embodiment of a CTLE system. Accordingly, FIG. 2 depicts an embodiment of an active CTLE system 100 which includes amplification and resistance-capacitance (RC) source degeneration. In the depicted embodiment, the CTLE system 100 includes amplification elements (e.g., MOSFET transistors) 102, 104 and adjustable RC elements 106, 108. More specifically, a voltage reference 110 may be connected to a gate of the amplification element 102 and a DQ input signal (e.g., DQ<15:8> and DQ<7:0>) 112 may be connected to a gate of the amplification element 104. Voltage source (VDD) 114 may be coupled to resistors 116 and 118 to provide for operating power. Bias elements or current source elements 120, 122 may also be provided, to establish a predetermined or desired current flow. The amplification elements 102, 104 may be referred to as a differential amplifier stage circuit, while the adjustable RC elements 106, 108 may be referred to as a source degeneration circuit.

As depicted, the resistors 116, 118 are coupled to drains of the amplification elements 110, 112 respectively. Additionally, sources of the amplification elements 102, 104 are coupled to the adjustable RC elements 106, 108. As the signal 112 is gated through the amplification element 104, the signal 112 may be amplified and filtered, for example to remove intersymbol interference (ISI). ISI may be caused by high frequency amplitude and phase distortion which may "smear" the data bits at the receiving side. Output for the CTLE system 100 may then be connected to nodes 123, 125. For example, the channel 55 may be connected via nodes 123, 125.

Figure 3:
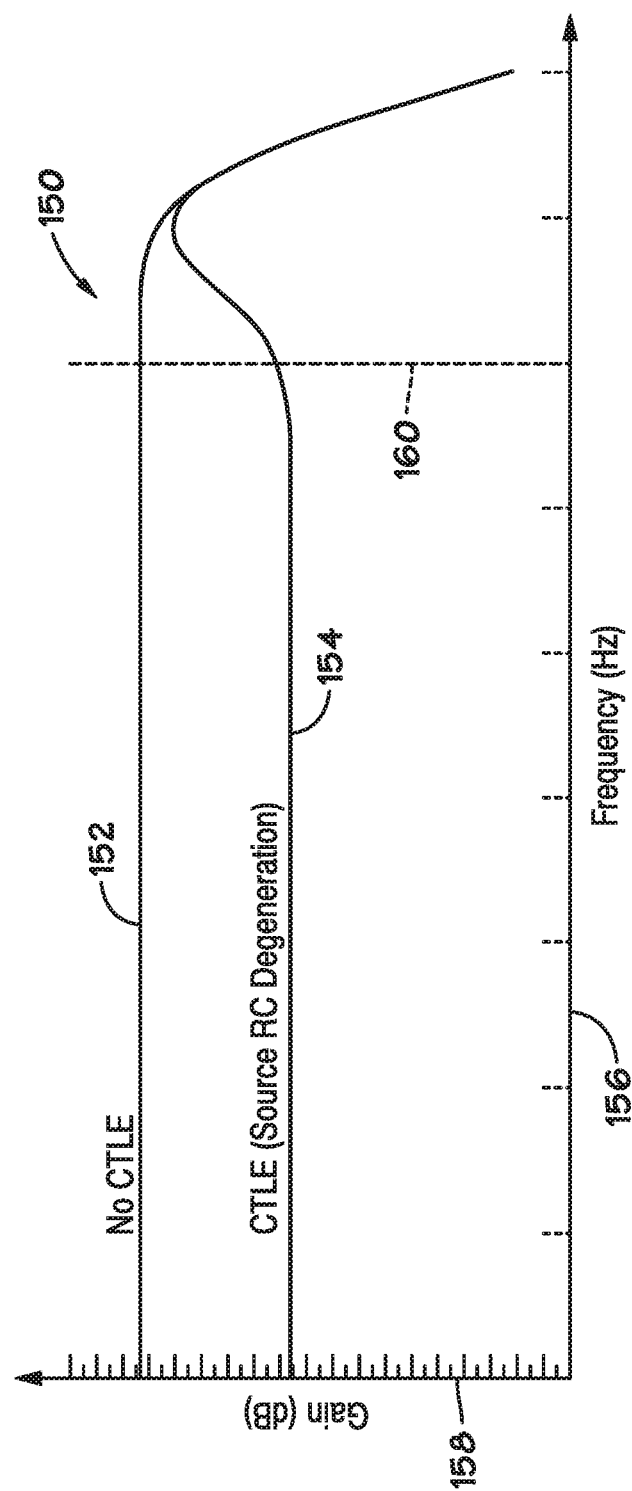
FIG. 3 is a diagram depicting certain gain-versus-frequency curves that may be provided using the CTLE techniques described herein, in accordance with an embodiment.

Turning now to FIG. 3, the figure is a graph 150 illustrating an embodiment of certain curves (e.g., gain-versus-frequency curves) 152, 154 plotted in a frequency domain. More specifically, the graph 150 includes an abscissa axis 156 having an increasing frequency and an ordinate axis 158 having an increasing gain in decibels (db). The curve 152 is representative of a signal having no CTLE processing. Accordingly, the signal shows a drop-off at higher frequencies. The curve 154 is representative of processing via the CTLE system 50 and/or 100. At frequencies higher than frequency 160, the CTLE system 50 and/or 100 may increase the gain. Accordingly, frequencies such as the Nyquist frequency (e.g., the minimum rate at which a signal can be sampled without introducing errors, which is twice the highest frequency present in the signal), may include amplified signals. However, amplification may also amplify unwanted noise. Accordingly, the CTLE system 50 incorporates certain circuitry, as shown in FIG. 4, which may provide both frequency gain and frequency suppression with adjustable elements.

Figure 4:
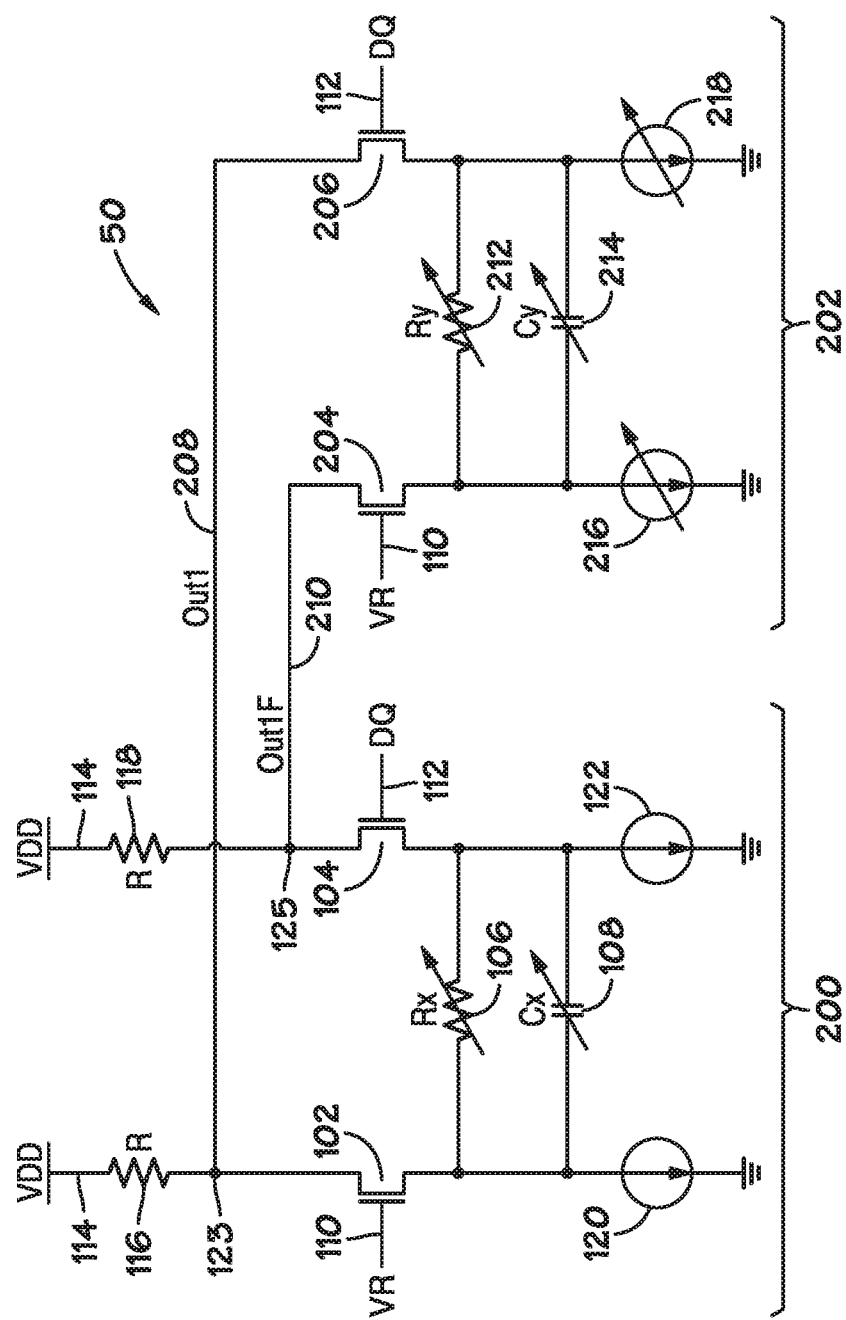
FIG. 4 is a circuit diagram of an active CTLE system which may provide for adjustable amplification and adjustable resistance-capacitance (RC) source degeneration of input signals for the memory device of FIG. 1, in accordance with an embodiment.

FIG. 4 illustrates an embodiment of the CTLE system 50 which may provide for adjustable amplification and frequency suppression. Because FIG. 4 includes the same elements as FIG. 2, the same element numbers are used to denote the same elements. As illustrated, the CTLE system 50 includes a first circuit 200 and a second circuit 202. In the depicted embodiment, the first circuit 200 is the same as the CTLE system 100 of FIG. 2. That is, the CTLE system 100 is included in its entirety in the first circuit 200 of the CTLE system 50, and in the depicted embodiment, is the same as the first circuit 200.

The second circuit 202 is connected to the first circuit 200 via amplification elements 204, 206. More specifically, a drain end of the amplification element 204 (e.g., MOSFET transistor) is coupled to the first circuit 200 at the drain end of the amplification element 102 downstream, of the resistor 116. Likewise, a drain end of amplification element 206 (e.g., MOSFET transistor) is coupled to the first circuit 200 at the drain end of the amplification element 104, downstream of the resistor 118. Nodes 208 and 210 are also shown. In certain embodiments, the nodes 208, 210 may include switches. By actuating the switches, the circuit 200 may be completely isolated or disconnected from the circuit 202. Accordingly, in some embodiments the CTLE 50 may be operating exactly as the CTLE 100, and when desired, the CTLE 50 may be dynamically reconfigured, via switches at the nodes 208, 210, to include both the circuit 200 and the circuit 202 for processing of DQ signals.

The second circuit 202 also includes adjustable RC elements 212 and 214. For example, the resistor 212 and the capacitor 214 may be adjusted to provide frequency filtering for the input signal 112. The second circuit 202 additionally includes adjustable bias or current sources 216, 218, which may be adjusted to increase or decrease bias current flow. The amplification elements 204, 206 may be referred to as a differential amplifier stage circuit, while the adjustable RC elements 212, 214 may be referred to as a source degeneration circuit.

Figure 5:
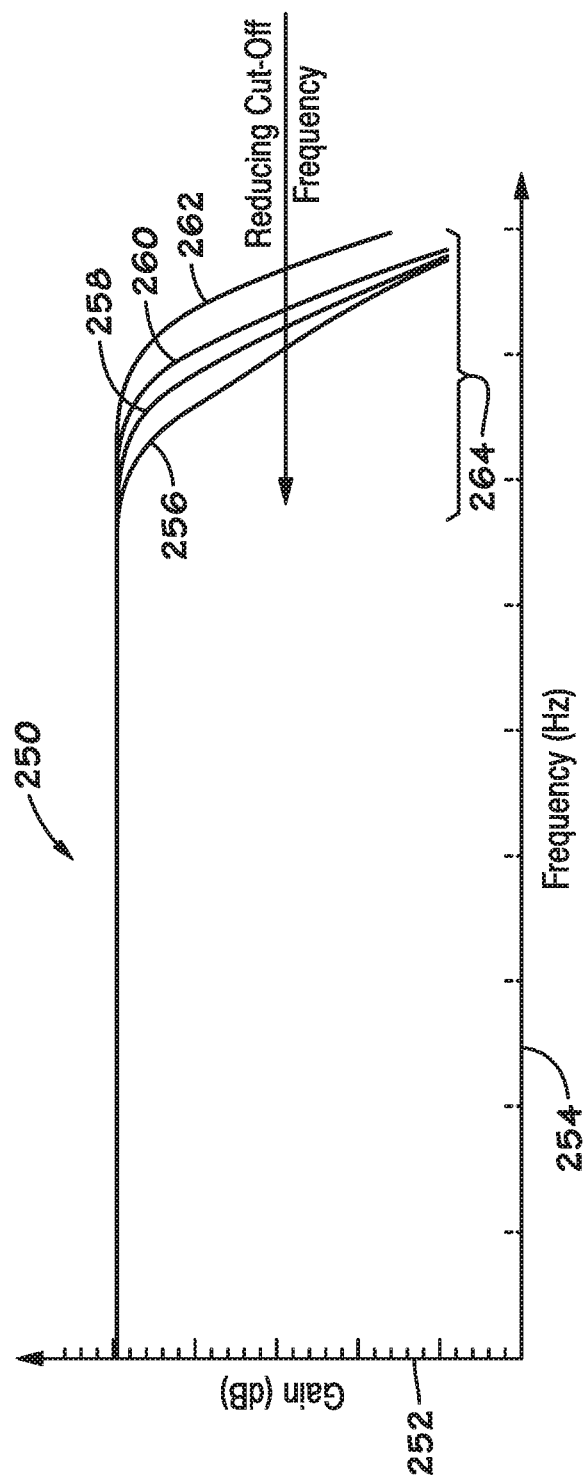
FIG. 5 is a diagram depicting additional gain-versus-frequency curves that may be provided using the CTLE techniques described herein, in accordance with an embodiment.

Additionally or alternatively, by adjusting the desired bias current, for example via resistor 106, capacitor 108, resistor 212, and/or capacitor 214, several different types of frequency shaping can be implemented. For example, FIG. 5 shows a graph 250 having an abscissa axis 252 with increasing frequency and an ordinate axis 254 with increasing gain in decibels (db) and various gain-versus-frequency curves which may have been shaped by the CTLE system 50. More specifically, the graph 250 shows embodiments of various gain-versus-frequency curves 256, 258, 260, 262 (e.g., frequency shaped curves) that may be provided via adjustments to the CTLE system 50, for example, by first setting resistor 106 to zero (i.e., Rx=0) and capacitor 108 to zero (i.e., Cy=0). The resistor 212 and capacitor 214 may then be used to adjust cut-off frequency in a frequency portion 264 (e.g., high frequency portion). That is, the CTLE system 50, through use of RC source degeneration (e.g., elements 212, 214) in a negative gain portion of the differential amplifier stage (e.g., elements 102, 104, 204, and/or 206), may suppress high frequency noise. Such high frequency noise suppression as shown in FIG. 5 may be desirable, for example, if the inherent bandwidth of the input buffer 52 is sufficient for the system requirements but high frequency noise is found.

In the depicted example, curve 262 may be representative of a gain-versus-frequency curve having too much unwanted noise, but yet the input buffer 52 may include bandwidth sufficient to meet data transmission requirements. Accordingly, high frequency suppression may improve noise elimination. Once the resistor 106 is set to zero (i.e., Rx=0) and the capacitor 108 is also be set to zero (i.e., Cy=0), the resistor 212 and capacitor 214 may then be adjusted (via to source degeneration techniques) to reduce cut-off frequencies. For example, curves 256, 258, and/or 260 may be produced, each having a reduced cut-off frequency when compared to curve 262. Accordingly, the unwanted noise may be reduced or eliminated via the CTLE system 50.

Figure 6:
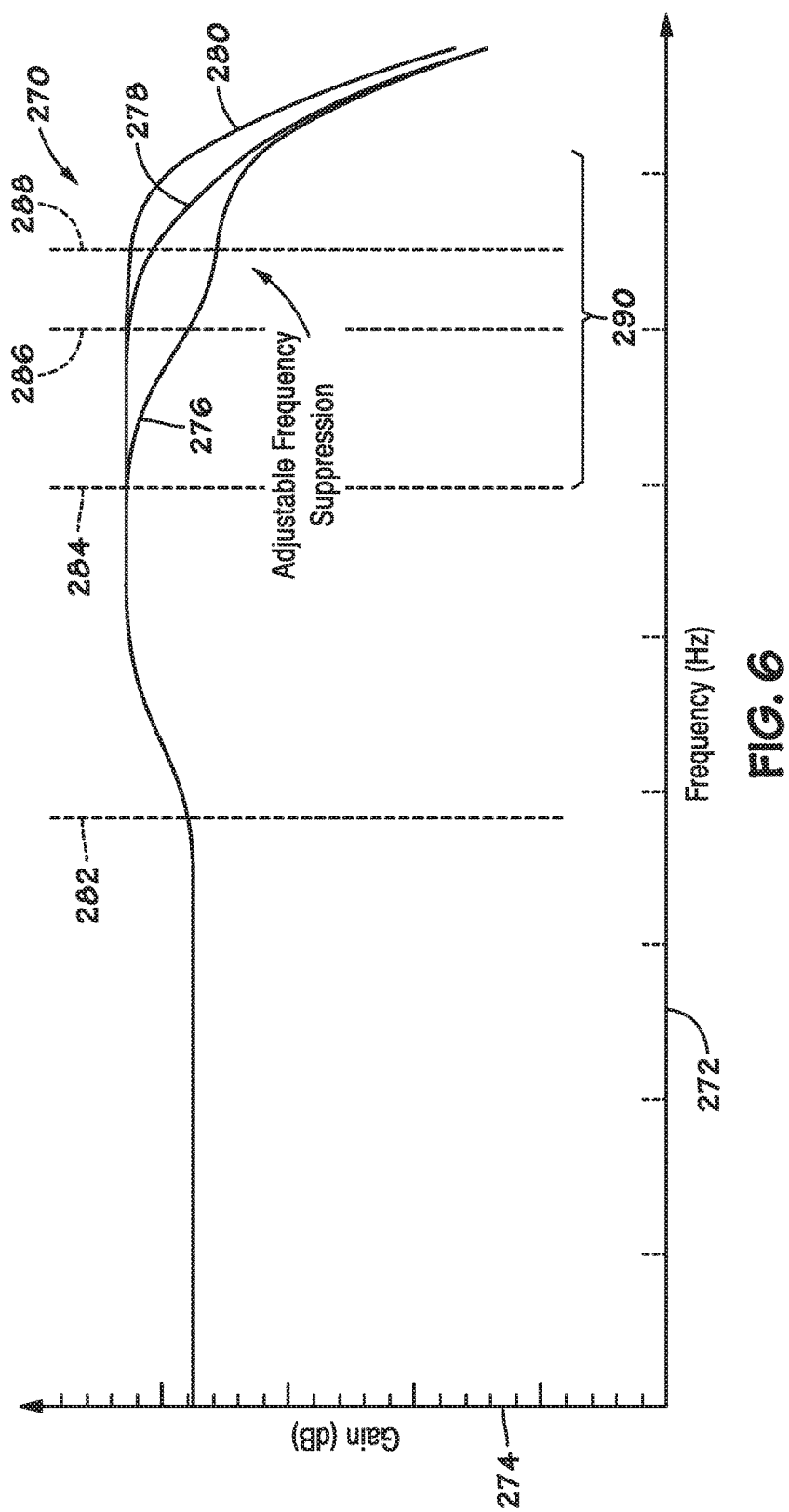
FIG. 6 is a diagram depicting further gain-versus-frequency curves that may be provided using the CTLE techniques described herein, in accordance with an embodiment.

In other situations, it may be beneficial to provide a gain at a desired frequency (e.g., system communications frequency) and also suppress a higher frequency noise, as shown in FIG. 6. More specifically, FIG. 6 illustrates a graph 270 having an abscissa axis 272 with increasing frequency and an ordinate axis 274 with increasing gain in decibels (db) and various gain-versus-frequency curves 276, 278, 280. In the depicted embodiment, the gain-versus-frequency curves 276, 278, 280 may have their respective gains adjusted so that that certain frequencies higher than frequency 282 may have a higher gain compared to frequencies lower than frequency 282. Gain adjustment may be provided, for example, by adjusting the resistor 106 and the capacitor 108. In addition to gain adjustment, frequency suppression adjustment may also be provided. For example, frequency suppression adjustment may be provided by adjusting, e.g., via RC source degeneration, the resistor 212 and the capacitor 214.

In the depicted example, CTLE system 50 adjustments provide for lowering of gain at frequencies 284, 286, and 288 in the gain-versus-frequency curves 276, 278, and 280, respectively, thus reducing or eliminating noise at higher frequencies. Further, portion 290 of the graph 270 depicts how the gain-versus-frequency curve 276 may be adjusted to include varying slopes at certain frequency ranges. As depicted, the gain-versus-frequency curve 276 includes a different slope between frequency 284 to frequency 286 than a slope between frequency 286 to frequency 288. By providing for both gain adjustments and frequency cut-off adjustments for input signals, the CTLE system 50 may enable a more flexible and customizable input buffer system 52.

The CTLE system 50 may additionally or alternatively provide gain at a desired frequency (e.g., the system frequency), but suppress gain in a lower frequency, as depicted in FIG. 7. More specifically, FIG. 7 shows a graph 300 having an abscissa axis 302 with increasing frequency and an ordinate axis 304 with increasing gain in decibels (db) and various frequency curves which may have been shaped by the CTLE system 50. The graph 300 shows embodiments of various gain-versus-frequency curves 306, 308, 310, 312 (e.g., frequency shaped curves) that may be provided via adjustments to the CTLE system 50, for example, by adjusting the resistor 106, the capacitor 108, the resistor 204, the capacitor 206, the bias element 216, and/or the bias element 218.

For the depicted gain-versus-frequency curves 306, 308, 310, 312, the magnitude of gain peaks 314, 316, 318, 320 and suppression peaks 322, 324, 326, 328, the location of the frequency gain and suppression (e.g., frequency at which gain and/or suppression occur), and the width of the peaks can be adjusted through the resistor 106, the capacitor 108, the resistor 204, the capacitor 206, the bias or current source 216, and/or the bias or current source 218. For example, gain may adjusted via resistor 106, and the capacitor 108, suppression may be adjusted via the resistor 212 and the capacitor 214, and widths may be adjusted via bias elements 216, 218. It is to be understood that while the CTLE 50 is described herein as being included in the input buffer 52, in other embodiments, the CTLE 50 may be included in any circuit that would benefit from adjustable linear equalization.

Figure 8:
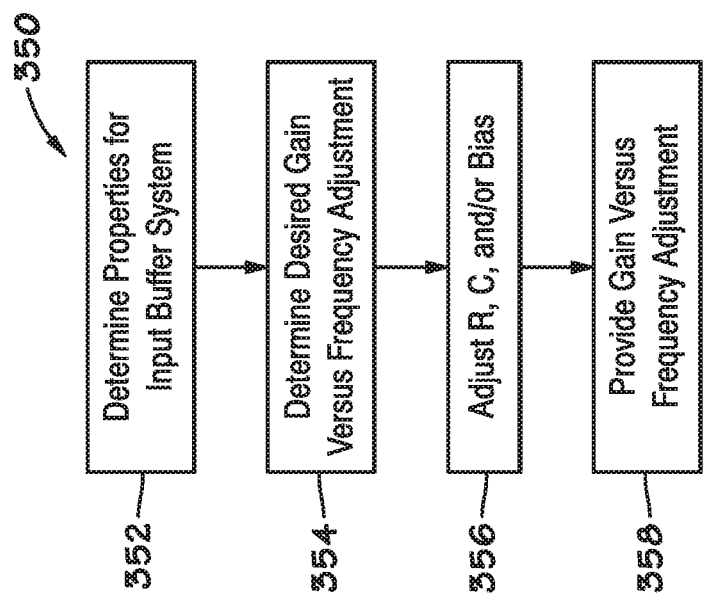
FIG. 8 is a flow chart of a process suitable for adjusting the CTLE system of FIG. 1 to provide for desired gain-versus-frequency curves, in accordance with an embodiment.

FIG. 8 is flowchart illustrating an embodiment of a process 350 suitable for adjusting the CTLE system 50 to provide for a desired gain-versus-frequency curve, for example, to be used in processing DQ input signals via the input buffer system 52. In the depicted embodiment, the process 350 may determine (block 352) certain properties of the input buffer system 52 or of other systems that include the CTLE system 50. For example, the system frequency for the input buffer system 52 may be determined (block 352), the desired data transmission rate (e.g., in gigabits per second) may also be determined (block 352), and/or the physical properties of communication channels 54, 55 (e.g., physical properties of conductor media and/or dielectric, including type, length, material composition, and so on) may additionally be determined (block 352). The determined properties may then show that a certain gain-versus-frequency curve would be beneficial for use in processing DQ input signals.

Accordingly, process 352 may then determine (block 354) a desired gain-versus-frequency curve to be provided by adjusting the CTLE system 50. For example, the CTLE system 50 may be used to provide desired gains at specific frequencies, as described earlier with respect to the gain-versus-frequency curves shown in FIGS. 3, 5, 6, and 7. Indeed, the CTLE system 50 may enable the amplification of signals but additionally provide for frequency shaping. The frequency shaping may include providing a desired magnitude of gain peaks, a desired magnitude of suppression peaks, a desired location of the frequency gain and suppression (e.g., frequency at which gain and/or suppression occur in a gain-versus-frequency curve), and/or the width of the gain and of the suppression peaks.

Once the desired gain-versus-frequency curve is determined (block 354), the process 350 may adjust (block 356) components of the CTLE system 50, such as the resistor 106, the capacitor 108, the resistor 204, the capacitor 206, the bias element 216, and/or the bias element 218 to provide for the desired gain-versus-frequency curve. For example, if only cut-off frequency reduction is desired, then the process 352 may set the resistor 106 to zero (i.e., Rx=0) and the capacitor 108 to zero (i.e., Cy=0). The resistor 212 and capacitor 214 may then be used to adjust cut-off frequency as described above with respect to FIG. 5. If specific gain peak(s) and specific cutoff frequency or frequencies are desired, then the resistors 106, 212 and/or the capacitors 108, 214 may be adjusted. Likewise, bias elements 216, 218 may be adjusted for example, for width shaping of peaks.

Once the CTLE system 50 is adjusted (block 356), input signals, such as DQ input signals, may be transmitted to the CTLE system 50 for processing (block 358). More specifically, the CTLE system 50 may receive the input signals as input and process them via circuits 200 and 202 to provide for desired gain(s) at specific frequencies. Indeed, the magnitude of gain peaks and suppression peaks, the location of the frequency gain and suppression (e.g., frequency at which gain and/or suppression occur), and the width of the peaks may be provided. The processed input signals may then be communicated to other components or systems, for example via the communication channel 55.

While the embodiments described herein may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the techniques and system described in the disclosure as defined by the following appended claims.

What is claimed is:

1. A continuous time linear equalization (CTLE) system, comprising:
   a first adjustable circuit comprising a first adjustable resistive-capacitive (RC) source degeneration circuit and a first differential amplifier stage circuit having a first differential pair of transistors; and
   a second adjustable circuit electrically having a second differential pair of transistors and configured to adjust a frequency suppression of a data signal received by the CTLE system, wherein the first adjustable circuit is electrically coupled to the second adjustable circuit via conduits connecting first drain ends of the first differential pair of transistors to second drain ends of the second differential pair of transistors, and wherein the CTLE system is configured to provide a gain-versus-frequency curve for the data signal based on adjustments to the first adjustable circuit, adjustments to the second adjustable circuit, or a combination thereof.

2. The system of claim 1, wherein the second adjustable circuit comprises a second RC source degeneration circuit configured to adjust the frequency suppression of the data signal.

3. The system of claim 2, wherein the second RC source degeneration circuit is disposed in parallel with the first source degeneration circuit.

4. The system of claim 2, wherein the second adjustable circuit comprises a second differential amplifier stage circuit having the second differential pair of transistors, wherein the data signal is configured to be received by both the first differential amplifier stage circuit and by the second differential amplifier stage circuit.

5. The system of claim 1, wherein the first adjustable circuit comprises at least one non-adjustable bias element.

6. The system of claim 1, wherein the second adjustable circuit comprises at least one adjustable bias element.

7. The system of claim 1, wherein the CTLE system is configured to adjust a first magnitude of a gain peak, a second magnitude of a suppression peak, a first location of a frequency gain, a second location of a frequency suppression, a first width of the gain peak, a second width of the suppression peak, or a combination thereof, for the gain-versus-frequency curve.

8. The system of claim 1, wherein the CTLE system comprises at least one output node configured to output a processed data signal to an external system, wherein the second adjustable circuit is at least partially electrically coupled to the first adjustable circuit via the at least one output node.

9. The system of claim 1, wherein the CLTE system is included in an input buffer of a memory device, and wherein the data signal is representative of data bits transmitted for storage into the memory device.

10. A method for applying a continuous time linear equalization (CTLE) system, comprising:
    determining one or more properties for a transmission channel configured to receive a data signal;
    determining a desired gain-versus-frequency curve based on the one or more properties; and
    adjusting the CTLE system to provide the gain-versus-frequency curve for the data signal based on adjustments to a first adjustable circuit of the CTLE system, adjustments to a second adjustable circuit of the CTLE system, or a combination thereof, wherein the first adjustable circuit is electrically coupled to the second adjustable circuit via conduits connecting first drain ends of a first differential pair of transistors included in the first adjustable circuit to second drain ends of a second differential pair of transistors included in the second adjustable circuit.

11. The method of claim 10, wherein adjusting the CTLE system comprises adjusting the CLTE system to provide for a first magnitude of a gain peak, a second magnitude of a suppression peak, a first location of a frequency gain, a second location of a frequency suppression, a first width of the gain peak, a second width of the suppression peak, or a combination thereof, for the gain-versus-frequency curve.

12. The method of claim 10, wherein the first adjustable circuit comprises a first adjustable resistive-capacitive (RC) source degeneration circuit and a first differential amplifier stage circuit having the first differential pair of transistors and wherein the data signal is processed via the first adjustable RC source degeneration circuit and the first differential amplifier stage to provide the processed data signal.

13. The method of claim 12, wherein the second adjustable circuit comprises a second adjustable RC source degeneration circuit and a second differential amplifier stage circuit having the second differential pair of transistors and wherein the data signal is processed via the second adjustable RC source degeneration circuit and the second differential amplifier stage to provide the processed data signal.

14. The method of claim 13, wherein adjusting the CTLE system to provide the gain-versus-frequency curve for the data signal comprises adjusting the first RC source degeneration circuit, adjusting the second RC source degeneration circuit, adjusting a bias of the second adjustable circuit, or a combination thereof.

15. The method of claim 10, comprising, receiving the data signal and processing the data signal via the CTLE to provide a processed data signal based on the bias to frequency curve.

16. A memory device, comprising:
    an input buffer system configured to receive a DQ input signal, the input buffer system comprising a continuous time linear equalization (CTLE) system, the CTLE system comprising:
        a first adjustable circuit comprising a first adjustable resistive-capacitive (RC) source degeneration circuit and a first differential amplifier stage circuit having a first differential pair of transistors; and
        a second adjustable circuit having a second differential pair of transistors and configured to adjust a frequency suppression of the DQ input signal, wherein the first adjustable circuit is electrically coupled to the second adjustable circuit via conduits connecting first drain ends of the first differential pair of transistors to second drain ends of the second differential pair of transistors, and wherein the CTLE system is configured to provide a gain-versus-frequency curve for the DQ input signal based on adjustments to the first adjustable circuit, adjustments to the second adjustable circuit, or a combination thereof.

17. The memory device of claim 16, wherein the second adjustable circuit comprises a second RC source degeneration circuit configured to adjust the frequency suppression of the DQ input signal, and a second differential amplifier stage circuit having the second differential pair of transistors, wherein the DQ input signal is configured to be received by both the first differential amplifier stage circuit and by the second differential amplifier stage circuit.

18. The memory device of claim 16, wherein the first adjustable circuit comprises at least one non-adjustable bias element, and wherein the second adjustable circuit comprises at least one adjustable bias element.

19. The memory device of claim 16, wherein the CTLE system is configured to adjust a first magnitude of a gain peak, a second magnitude of a suppression peak, a first location of a frequency gain, a second location of a frequency suppression, a first width of the gain peak, a second width of the suppression peak, or a combination thereof, for the gain-versus-frequency curve.

20. The memory device of claim 16, wherein the CTLE system comprises at least one output node configured to output a processed data signal to the input buffer, wherein the second adjustable circuit is at least partially electrically coupled to the first adjustable circuit via the at least one output node.

* * * * *